United States Patent
Curless et al.

(10) Patent No.: US 6,873,918 B2
(45) Date of Patent: Mar. 29, 2005

(54) CONTROL EMBEDDED MACHINE CONDITION MONITOR

(75) Inventors: Richard A. Curless, Loveland, OH (US); Paul E. McCalmont, Cincinnati, OH (US)

(73) Assignee: Unova IP Corp., Everett, WA (US)

(*) Notice: Subject to any disclaimer, the term of this patent is extended or adjusted under 35 U.S.C. 154(b) by 0 days.

(21) Appl. No.: 10/432,892

(22) PCT Filed: Nov. 30, 2001

(86) PCT No.: PCT/US01/48556
§ 371 (c)(1), (2), (4) Date: Dec. 18, 2003

(87) PCT Pub. No.: WO02/45407
PCT Pub. Date: Jun. 6, 2002

(65) Prior Publication Data
US 2004/0083009 A1 Apr. 29, 2004

Related U.S. Application Data

(60) Provisional application No. 60/250,621, filed on Dec. 1, 2000.

(51) Int. Cl.[7] .......................... G06F 19/00; G06F 11/30
(52) U.S. Cl. ........................ 702/36; 702/35; 702/182; 702/188

(58) Field of Search .............................. 702/33–35, 56, 702/81–82, 141, 146, 182, 189–191, 36, 187, 104; 73/587, 599, 660; 700/1, 10; 318/560, 568.24

(56) References Cited

U.S. PATENT DOCUMENTS

| 4,426,641 A | * | 1/1984 | Kurihara et al. ............ 340/683 |
| 4,506,551 A | * | 3/1985 | Ray ............................ 73/660 |
| 5,201,292 A | * | 4/1993 | Grajski et al. ......... 123/406.38 |

* cited by examiner

Primary Examiner—Bryan Bui
(74) Attorney, Agent, or Firm—Reising, Ethington, Barnes, Kisselle, P.C.

(57) ABSTRACT

Analog signals are generated in response to one or more operating parameters of a machine such as vibration and used to provide a log of the operating history of the machine. The analog signals are converted into root mean square (rms) values which are periodically sampled. The sampled signals are sorted into predefined rms value bands. Each occurrence of a signal in an rms value band is used to increment a counter in order to keep track of the number of occurrences of signals in a particular rms value band. The number of accumulated signals in each of the rms value bands provides an indication of the usage and condition of the machine.

17 Claims, 2 Drawing Sheets

CONTROL EMBEDDED MACHINE CONDITION MONITOR

This application claims the benefit of Provisional Application No. 60/250,621, filed Dec. 1, 2000.

BACKGROUND OF THE INVENTION

The present invention relates in general to methods and apparatus for monitoring the operation and use of a machine. More particularly, the present invention relates to methods and apparatus for monitoring the operation and use of a machine for the purpose of diagnosing the mechanical condition of the machine based thereon.

It is known to monitor machine operation parameters, such as, for example, machine vibration, temperature, sound, force or pressure, motor current or lubricant oil temperature, viscosity or composition, and to evaluate such monitored parameters for the purpose of providing an indication of the condition of the machine. For example, a thermocouple may be located within the lubricant "bath" so as to alert the machine operator when the temperature of the oil has exceed some predetermined threshold value. In another example relating to machine vibration, techniques employed to monitor and to analyze machine vibration for the purpose of providing an indication of the condition of the machine range from the very simple, such as touching or listening to a machine, to the very complicated, such as detecting time-domain signals, converting those signals to frequency-domain signals, and computer-processing the resulting frequency domain signals. Techniques at the lower range of the monitoring and analysis spectrum are overly-simplified and do not provide reliable results whereas techniques at the upper range of the spectrum are overly-complicated and are typically so expensive so as to prohibit their widespread use by most machine operators.

Accordingly, there is a need for new and improved monitoring and analysis techniques for providing an indication of the condition of a machine, such as an indication of the general "health" of the machine by providing a running history or profile of the machine's operation or usage. Preferably, such monitoring and analysis techniques would provide reliable results, would be easy to use, would be relatively inexpensive and would be adaptable to improve the operating practices of the machine, such as, for example, as one component of the machine operator's predictive/preventative maintenance procedures. There also is a need for new and improved analysis techniques for providing an indication of the useful "life" remaining in a machine, based upon actual past machine operation and usage.

SUMMARY OF THE INVENTION

These and other needs are met by the present invention wherein analog signals generated in response to one or more operating parameters of a machine, such as, for example, vibration, temperature, sound, force, pressure, motor current or lubricant oil temperature, viscosity or composition, are converted into root-mean-square ("rms") values which are periodically sampled, sorted into predefined rms value bands and stored as an evolving history log of the actual operation of the machine. Data stored in a machine operation history log may be analyzed to evaluate past machine operation and usage, to provide an indication of the general "health" of the machine, or to provide an indication of the useful "life" remaining in the machine. In addition, data stored in the log may be analyzed as a component of a machine operator's predictive/preventative maintenance procedure.

In accordance with one aspect of the present invention, a machine is monitored by coupling a transducer to the machine at a location thereon likely to detect changes in the level of one or more operating parameters of the machine's operation. The transducer preferably is adapted to generate analog signals representing the level of the operating parameter detected. The analog signals are converted to rms signals which are periodically sampled to generate rms sample values. The rms sample values are processed according to each sample value's respective level or magnitude and thereafter sorted into two or more signal magnitude bands, where the number of rms samples detected in each of the at least two signal magnitude bands is accumulated over time to provide an indication of the usage and condition of the machine.

In accordance with another aspect of the present invention, a machine is monitored by coupling a transducer to the machine at a location thereon likely to detect changes in the level of one or more operating parameters of the machine's operation. The transducer preferably is adapted to generate analog signals representing the level of the operating parameter detected and is operatively coupled to a machine controller of the machine. The analog signals are converted to rms signals, which the controller periodically samples and generates rms sample values corresponding thereto. The controller then processes the rms sample values according to each sample value's respective level or magnitude, sorts the rms sample values into sample magnitude bands, accumulates the number of rms sample values into each of at least two magnitude bands and uses the accumulated numbers of accumulated rms samples in the at least two magnitude bands to provide an indication of the usage and condition of the machine.

In accordance with yet another aspect of the present invention, a machine is monitored by monitoring analog signals representative of operation of the machine. The analog signals are converted to rms signals that are periodically sampled to generate rms sample values. The rms sample values are processed according to each rms sample value's magnitude or level and sorted into two or more sample magnitude bands. The numbers of rms sample values are accumulated in each of at least two sample magnitude bands and the numbers of accumulated rms sample values in the at least two sample magnitude bands are used to provide an indication of the usage and condition of the machine.

In accordance with still another aspect of the present invention, an apparatus for monitoring a machine having a controller comprises a transducer coupled to the machine. Circuitry is provided for converting analog signals received from the transducer to rms signals. The machine controller is then operated to perform the functions of: periodically sampling the rms signals to generate rms sample values; sorting the rms sample values according to each rms sample value's level or magnitude; accumulating the number of rms sample values in each of at least two magnitude bands; and, providing an indication of the usage and condition of the machine from the accumulated numbers of rms sample values accumulated in at least one of the at least two magnitude bands.

These and additional objects, features and advantages of the present invention will become apparent to those reasonably skilled in the art from the description which follows, and may be realized by means of the instrumentalities and combinations particularly pointed out therein, as well as by those instrumentalities and combinations equivalent thereto.

BRIEF DESCRIPTION OF THE DRAWINGS

A better understanding of the present invention will be had upon reference to the following description in conjunction with the accompanying drawings in which like numerals refer to like parts, and wherein.

DETAILED DESCRIPTION OF THE PREFERRED EMBODIMENTS

Figure 1:
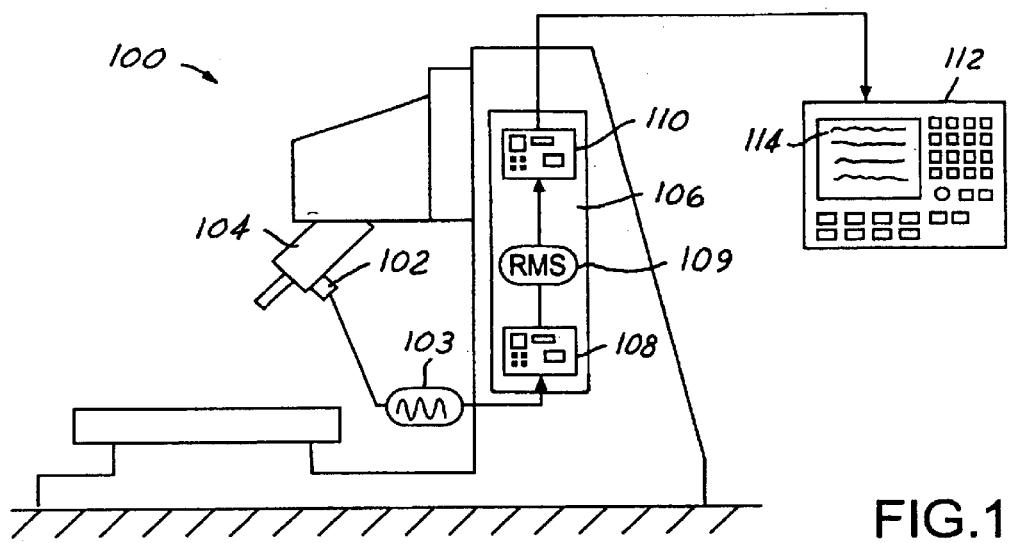
FIG. 1 is a schematic side view of an exemplary machine tool having an apparatus according to a preferred embodiment of the present invention installed thereon.

A preferred embodiment of the present invention will now be described with reference to the various drawing figures, wherein FIG. 1 is a schematic side view of an exemplary machine tool, such as, for example, a vertical machining center 100. It will be apparent to those of ordinary skill in the art, upon reading the within description, that the apparatus and method according to the various embodiments of the present invention may be practiced with respect to machines of alternative configurations, structures and operations without departing from either the spirit or the scope of the present invention. For example, the apparatus and method according to the various embodiments of the present invention may be used on any combination of other machine tools, such as horizontal machining centers, turning centers, milling machines, profilers, routers, planers, boring mills, drills, broaches, gear-cutters, screw-cutters, shapers, grinders, press brakes or reamers, on any combination of composite-material forming machinery such as fiber-placement machines or composite tape-laying machines, on any combination of robotic machinery or on any combination of any other type of machinery where there is a need or desire to obtain an indication of the usage and condition thereof.

According to a preferred embodiment of the present invention, one or more signal transducers (which may be analog or digital, but preferably analog) are used to monitor any combination of one or more operating parameters or characteristics of a machine's operation, such as, for example, vibration, temperature, sound, force, pressure, motor current or lubricant oil temperature, viscosity or composition. Output signals from the transducers are processed to provide an inexpensive view of the running history of the usage and operation of the machine 100. For ease of illustration, a preferred embodiment of the present invention will be described with reference to a system wherein a single transducer is used and is selected to be an accelerometer 102 mounted to a machine tool spindle 104 for the purpose of monitoring acceleration forces exerted on the spindle during machining operations. Additional transducers may be coupled to other portions of the machine to monitor other characteristics of machine operation as required for a given application, as will be apparent to those of ordinary skill in the art. In addition to the history of machine operation, real-time machine operating conditions may be monitored, viewed and analyzed to provide an operator with an indication of the real-time operating conditions of the machine and to alert the operator of any significant operating events, such as excessive vibration acceleration, lubricant oil temperature or the like.

FIG. 1 shows an apparatus coupled to the machine 100 for use according to a preferred embodiment hereof wherein the accelerometer 102 is powered from a power source located inside an electrical cabinet 106 coupled to the machine 100 in a conventional manner. Analog signals generated by the accelerometer 102 are conditioned by a first electrical circuit 108 and passed to voltage measuring and analog-to-digital converter ("ADC") circuitry 110 so that digital signals representative of the acceleration forces are passed to a computerized numeric controller 112 for further processing. The first electrical circuit 108 includes amplification and root-mean-square ("rms") signal generating components. It is noted that circuitry performing the functions of the first electrical circuitry 108 can be included in the accelerometer 102 so that rms signals are generated directly by the accelerometer 102 rather than by a separate circuit such as first circuit 108. Accelerometers of both types are commercially available from a number of manufacturers including, for example, PCB Peizotronics of Depew, N.Y. Normal control sampling of the rms signals at a relatively low sample rate is adequate to represent, over time, the operating conditions of the machine 100. For this reason, ADC circuitry 110 may take the form of an inexpensive, commercially-available computer interface card since a high sample rate digital signal processing board (as is commonly employed for sophisticated vibration signal analysis in existing systems) is not required. For example, the present invention contemplates adequate sampling rates ranging from one sample every millisecond to one sample every 10 seconds. Alternatively, rather than providing separate ADC circuitry 110, rms sample values may be supplied by first circuit 108 directly to the machine controller 112 and processed in accordance with the present invention. Even further, rather than providing separate first circuit 108, rms sample values may be supplied by accelerometer 102 directly to the machine controller 112 and processed in accordance with the present invention.

In any event, rms sample values representative of acceleration forces exerted on the spindle 104 are received by the controller 112 and processed to quantify the general severity of operation of the machine 100. Since rms signal values are used, short duration events, such as impulses, may not be detected, due to the low sampling rate. Similarly, peak amplitudes of some events may go undetected. However, the general trend of the characteristics and conditions of machine operation and use can be ascertained from the rms sample values acquired at some predetermined sample rate over time.

Currently available analysis systems known to applicants require sophisticated computer processors equipped with a great amount of computer memory to store data for multiple vibration spectra. If only limited memory is available to acquire, store and analyze sample data, only the overall levels or frequency band levels can be monitored to trend the data over time. As overall levels increase, an alarm is provided to indicate a deteriorating condition of the machine. While such monitoring is adequate to detect wear- or fatigue-induced equipment failures of machinery having relatively stable and consistent operating conditions, it generally is not adequate for machines that are operated under non-stable or varying conditions. That is, traditional fatigue-analysis procedures presuppose a substantially continuous operating condition with operating characteristics that do not vary significantly over time. On the other hand, typical machine tool usage subjects the machine 100 to widelyvarying operating conditions. For example, utilization of different tooling and/or different depths of cut may place different levels of vibration acceleration on the machine 100 to create greater or lesser degrees of use or abuse thereof. To this end, the present invention is suitable to monitor machine operations and operating severity for stable and consistent operating conditions, as well as for non-stationary or varying operating conditions. An advantage of the present invention is that it does not require the use of a standard "maintenance cycle" to assess the condition of the machine, but rather may assess operating conditions based on accumulated data representing the actual use and operation of the machine 100.

An exemplary method according to a preferred embodiment of the present invention may be implemented on a computer or computer processor having only a limited amount of computer memory, although the methods and apparatus described herein can be implemented on more powerful computers as well. As will be discussed is greater detail below, the computer need only be suitable for storing single numbers for each of two or more acceleration force bands and/or for incrementing two or more counters to accumulate data within selected bands of vibration acceleration. Moreover, by using the sampling rate of the controller 112 such as in one alternative embodiment hereof, time periods of exposure of the machine 100 to measure acceleration levels of the spindle 104 can also be estimated.

Figure 2:
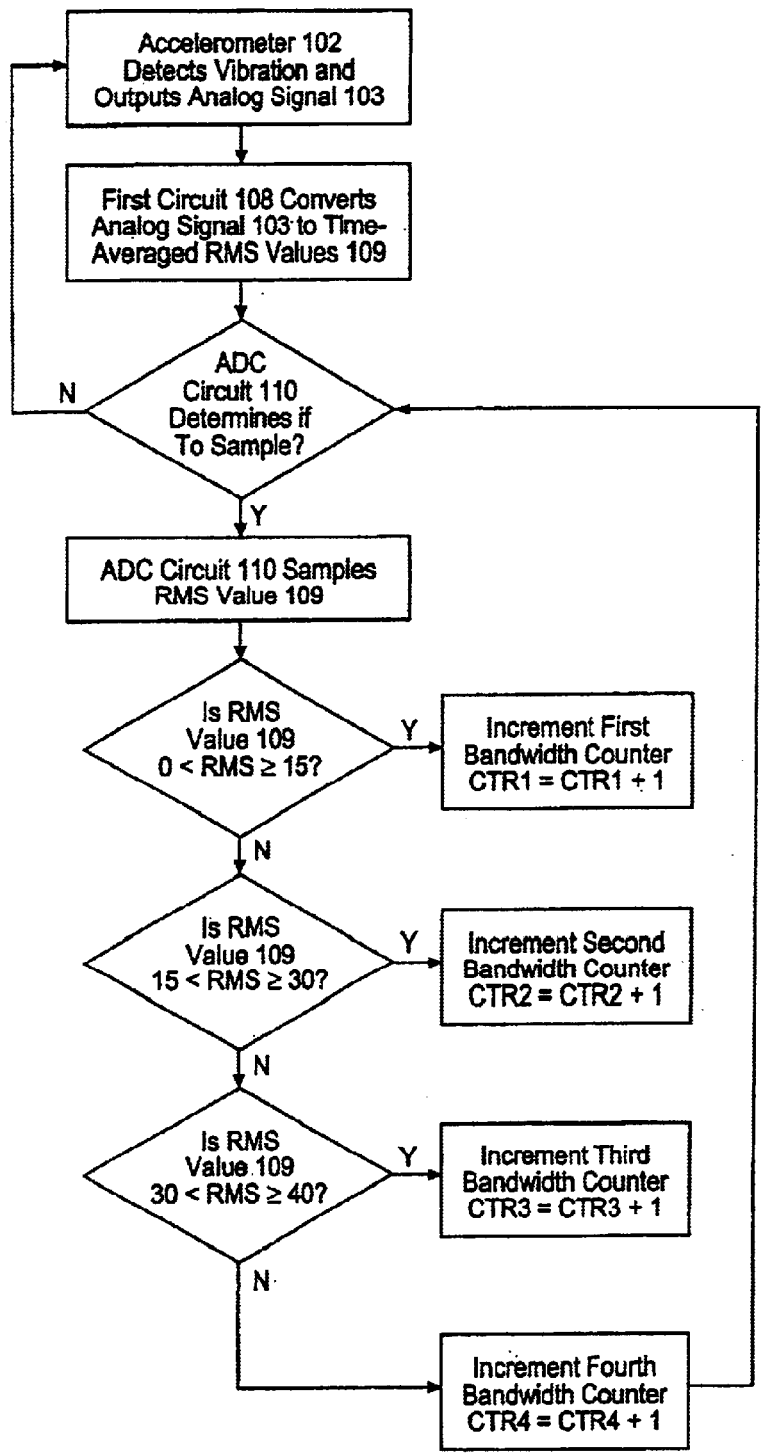
FIG. 2 is a flow chart showing operation of a preferred method of practicing the present invention.

With reference now to FIG. 2, a method of practicing the present invention according to a preferred embodiment thereof will be described in further detail. As described above, the transducer is in the form of an accelerometer 102 coupled to a machine tool spindle 104 and is adapted to output an analog signal 103 representing the level or magnitude of acceleration forces exerted on the spindle 104. First circuit 108 continuously receives the analog signal 103 and conditions the analog signal 103, for example, by amplifying it. Circuit 108 also periodically calculates time-averaged root-mean-square values 109 of the signal 103 and stores the rms value 109 until such time as a new rms value 109 is calculated, at which time, the new rms value 109 replaces the old rms value.

At some predetermined sample rate, for example, one sample per second, programmed into ADC circuit 110, the ADC circuit 110 obtains, acquires or otherwise samples the current value of the rms value 109 of the analog signal 103 and determines the level or magnitude of the rms value 109. The ADC circuit 110 then supplies the machine controller 112 with the sampled rms value 109, and more preferably, with the absolute value of the sampled rms values 109.

The machine controller 112 is programmed to include two or more bandwidth counter "bins", which store counter values corresponding to preselected bands—or ranges—of sampled rms values 109 and to sort the magnitudes of the sampled rms values 109 into the two or more bandwidth counters. For example, machine controller 112 provides a first bandwidth "bin" for counting the number of rms sample values 109 falling within a first range between 0 g and 15 g, a second bandwidth "bin" for counting the number of rms sample values 109 falling within a second range between 15 g and 30 g, a third bandwidth "bin" for counting the number of rms sample values 109 falling within a third range between 30 g and 40 g and a fourth bandwidth "bin" for counting the number of rms sample values 109 greater than 40 g. As the machine controller 112 receives each rms sample value 109, the machine controller 112 compares the rms sample value 109 to the predetermined bandwidth "bin" ranges. Depending on which bandwidth "bin" the rms sample value 109, falls in, the machine controller 112 increments the corresponding bandwidth "bin" counter accordingly.

For example, if the machine controller 112 determines that the rms sample value 109 is between 0 g and 15 g, a first bandwidth counter CTR1 is incremented by a value of one. If, instead, the machine controller 112 determines that the rms sample value 109 is between 15 g and 30 g, a second bandwidth counter CTR2 is incremented by a value of one. Similarly, if the machine controller 112 determines that the rms sample value is between 30 g and 40 g, or is greater than 40 g, a third or fourth counter CTR3, CTR4, respectively, is incremented by a value of one. As each counter is incremented according to the rms sample values 109, the ADC circuit 110 obtains additional rms sample values 109. In this manner, the counter values accumulated in each of the bandwidth "bins" represent measures of the trends of the machine 100 to operate under certain operating conditions. Any of the counters may be reset to zero, for example, where a new spindle 104 is installed on the machine 100 and where retention of operational history data acquired theretofore concerning the prior spindle is not required.

While the preferred embodiment hereof has been described with reference to four bandwidth "bins", any number of "bins" representing greater or lesser ranges may be utilized as the machine operator deems fit for the particular type and general operating environment of the machine. One advantage of the present invention is that substantial computer resources, such as memory, are not required in order to practice the method hereof. For example, because the computer is storing only the counter values, a single memory register for each of the bandwidth "bins" is all that is required. Vast computer memory resources (such as are used in the prior art to store vibration spectra) are not necessary.

Figure 3:
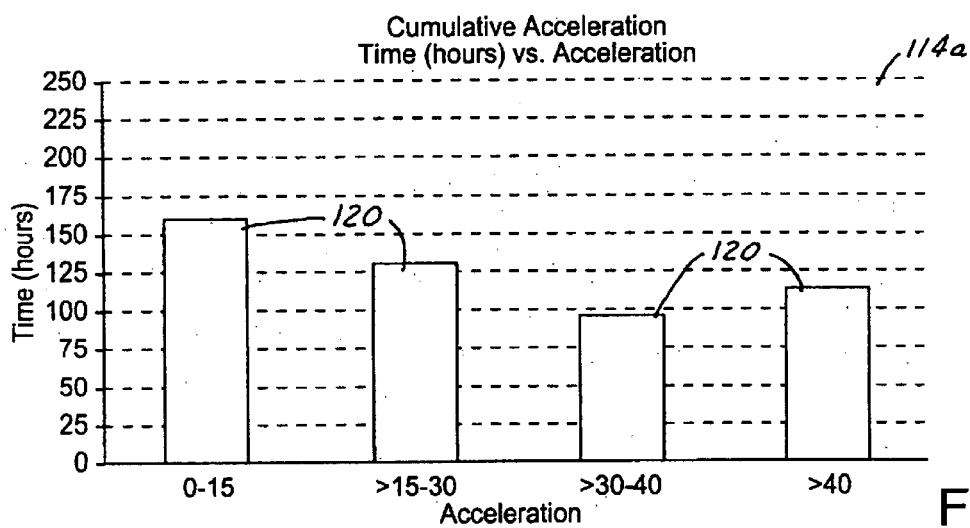
FIG. 3 is an exemplary illustration of a display showing accumulated machine tool spindle vibration acceleration collected and displayed in accordance with a preferred method of practicing the present invention; and, FIG. 4 is an exemplary illustration of a display showing real-time machine tool spindle vibration acceleration and peak-value maximum vibration acceleration monitored, collected and displayed in accordance with a preferred method of practicing the present invention.
Figure 4:
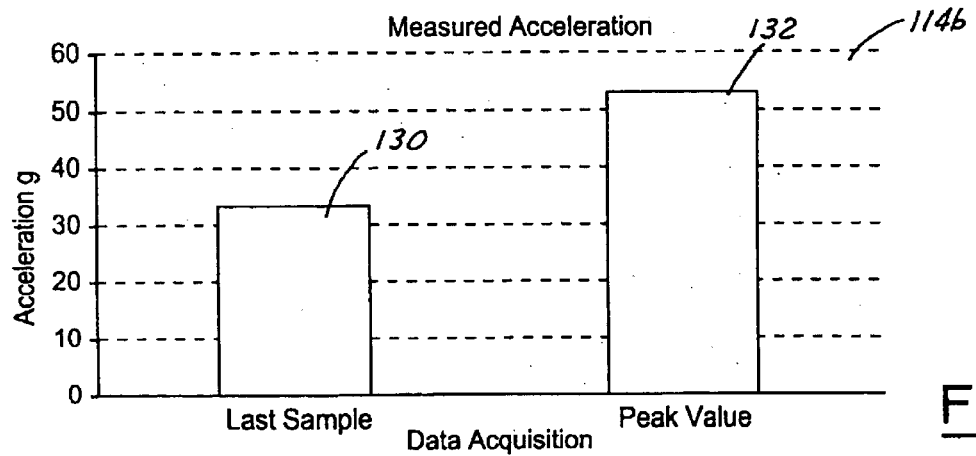

Referring now to FIG. 3, data accumulated for each of these bands 120 may be displayed on a display 114 of the controller 112 where cumulative data is displayed in the form of a first histogram 114a. In addition, referring also to FIG. 4, a second histogram 114b may be displayed on the display 114 to show the magnitude of the last-sampled rms level 130, the maximum rms level 132 sampled during some predetermined period, as well as other desired data (not shown) relating to machine operation. To provide the machine operator with useful information concerning the nature of operating conditions exceeding some predetermined threshold value, a limited number of event type descriptions can be stored with the data. Similarly, since the system is embedded on the machine, i.e., incorporated into the controller 112 rather than provided in a separate computer control, alarms and alerts can be generated by the controller 112 based upon data sampled from the transducer to notify the machine operator of critical operating events, such as a spindle vibration acceleration exceeding some predetermined threshold value.

The data accumulated in the present invention can also be used to calculate machine "expended life" or "life remaining" measure similar to the known "accumulated fatigue damage factor ("AFDF") and/or "$L_{10}$" or "$B_{10}$" bearing life calculations. Typical "expended life" or "life remaining" calculations are based on cyclical stress, so the number of cycles at a particular stress level is required. In the present invention, the number of stress cycles is not established exactly, since data is not sampled continuously and as such, the number of cycles is not recorded precisely. However, a number of methods may be used to estimate accumulated damage based upon data sampled according to the present invention.

One method presumes that the cycles are predominantly due to such factors as: the rotational speed of the spindle 104, the number of impacts of the cutting edge of the tool on the workpiece, and/or the natural frequency of the machine 100. Because the apparatus is embedded within the controller 112, other measurements can be associated with the measured spindle vibration acceleration, such as spindle speed, horse power, feedrate of axes, axis motor current and the like and used alone or in combination with one another to generate a stress profile. The selection of a particular tool used and its "force profile" can also be associated with vibration measurements.

Machine evaluation techniques based on the baseline empirical measurements can be utilized in a "learn cycle" for use in a damage assessment algorithm. Fuzzy logic type algorithms would be appropriate for such machine evaluation techniques. For example see:

$$\text{Accumulated Fatigue Damage Factor("AFDF")} = \sum_{j=1}^{\sigma=x}(n_1\sigma_1^b + \ldots + n_x\sigma_x^b) \quad \text{(Eq. 1)}$$

where: n=number of stress events;
σ=magnitude of the stress event; and,
b=slope of log-log S-N curve For the present invention, the use of information readily available within the controller 112 is expanded. That is, the number of stress events, n, will be defined to include stress events estimated from several measures, such as spindle speed, number of teeth on cutter, empirically-determined predominant vibration, and frequency. The number of stress events, n, then, can be used in Eq. 1 to calculate the AFDF, which may then used in a conventional manner to determined the accumulated fatigue damage suffered by the machine.

For example:
n (rpm, m)=number at assumed cycles of the acceleration margin predominant vibration assumed to be tooth impacts so, if spindle speed=2000 rpm and number of cutter teeth m=6 then:
n=2000 rpm×6 teeth=12,000 cycles/min Thus, for every minute at 10 g's rms operating at 2000 rpm with this cutter, 12,000 stress cycles of 10 g magnitude are presumed.

Similarly, the stress events can be defined by operation severity calculations, based not only on the vibration acceleration level, but also the combined dosage of spindle horsepower, axis thrust, vibration, etc.

$\sigma(x, hp, I_{axis})$

Such an embedded algorithm is then be used to indicate remaining life:

Expected life−AFDF use=remaining life.

While the invention has been illustrated with reference to one or more preferred embodiments hereof, and such preferred embodiments have been described in considerable detail with reference to the drawings, it is not the intention of applicants that the invention be restricted to such detail. Rather, it is the intention of the applicants that the invention be defined by all equivalents of the preferred embodiments falling within the scope hereof.

We claim:

1. A method for evolving a history log of the operating history of a machine that is subjected to non-stationary or varying operating conditions characterized in that said method comprises the steps of:

coupling a transducer to the machine, said transducer generating signals representative of the operation of said machine;

converting said signals to a root mean square (rms) signal;

periodically sampling said rms signal to generate rms samples and processing said rms samples according to rms sample magnitude;

sorting said rms samples into signal magnitude bands;

incrementing a bandwidth counter by a value of one for each rms sample contained within a signal magnitude band; and, using the counter value of each of the bandwidth counters to create an output indication of the operational history of the machine.

2. A method for monitoring the operational history of a machine using a machine controller, characterized in that said method comprises the steps of:

coupling a transducer to a machine to be monitored, said transducer generating signals representative of the operation of said machine;

converting said signals to a root mean square (rms) signal;

coupling said rms signal to a controller of said machine;

operating said controller to periodically sample said rms signal and generate rms samples;

operating said controller to process said rms samples according to sample magnitude;

operating said controller to sort said rms samples into signal magnitude bands;

incrementing a bandwidth counter by a value of one for each rms sample contained within a signal magnitude band; and, using the counter value of each of the bandwidth counters to develop a display indicative of the usage and condition of said machine.

3. A method for monitoring the operational history of a machine, characterized in that said method comprises the steps of:

monitoring signals representative of the operation of said machine and converting said signals to a root mean square (rms) signal;

periodically sampling said rms signal to generate rms samples;

processing said rms samples according to sample magnitude;

sorting said rms samples into signal magnitude bands;

accumulating the number of rms samples in each of at least two magnitude bands;

incrementing a bandwidth counter by a value of one for each rms signal contained within a signal magnitude band; and, using the bandwidth counter value to determine the usage and condition of said machine.

4. An apparatus for monitoring the operational history of a machine that is subjected to non-stationary or varying operating conditions having a controller, said apparatus comprising:

a transducer coupled to said machine; and, circuitry for converting signals supplied to said circuitry from said transducer to root mean square (rms) signals; characterized in that said controller of said machine is operated to perform the functions of:

sampling said rms signals to generate rms samples;

sorting said rms samples according to sample magnitude;

accumulating in a bandwidth counter the number of rms samples in each of at least two magnitude bands; and, determining the usage and condition of said machine from the accumulated number in the bandwidth counter for at least one of said at least two magnitude bands.

5. The method for monitoring a machine as claimed in claim 1 wherein said step of periodically sampling said rms signal comprises the step of sampling said rms signal at a known sampling rate.

6. The method for monitoring a machine as claimed in claim 1, wherein said machine comprises a machine tool and said step of coupling a transducer to said machine tool comprises the step of coupling an accelerometer to a spindle of said machine tool to monitor vibration accelerations of said spindle.

7. The method for monitoring a machine as claimed in claim 1 further comprising the step of displaying the accumulated numbers of rms samples in at least one of said at least two magnitude bands.

8. The method for monitoring a machine as claimed in claim 1 wherein said step of said transducer generating said signals further comprises the step of generating analog signals.

9. The method for monitoring a machine as claimed in claim 1 wherein said step of said transducer generating said signals further comprises the step of generating digital signals.

10. The method for monitoring a machine as claimed in claim 2 further comprising the step of operating said controller to display the accumulated numbers of rms samples in said at least two magnitude bands.

11. The method for monitoring a machine as claimed in claim 2 wherein said step of said transducer generating said signals further comprises the step of generating analog signals.

12. The method for monitoring a machine as claimed in claim 2 wherein said step of said transducer generating said signals further comprises the step of generating digital signals.

13. The method for monitoring a machine as claimed in claim 3 wherein said step of monitoring signals further comprises the step of monitoring analog signals.

14. The method for monitoring a machine as claimed in claim 3 wherein said step of said monitoring signals further comprises the step of monitoring digital signals.

15. The apparatus for monitoring a machine as claimed in claim 4 wherein said controller further comprises a display for displaying the accumulated number of rms samples in at least one of said at least two magnitude bands.

16. The apparatus for monitoring a machine as claimed in claim 4, wherein said signals supplied to said circuitry from said transducer are analog signals.

17. The apparatus for monitoring a machine as claimed in claim 4, wherein said signals supplied to said circuitry from said transducer are digital signals.

* * * * *